Dec. 3, 1940.  J. H. E. THORÉN  2,223,748
BEARING SEAL
Filed Dec. 13, 1938
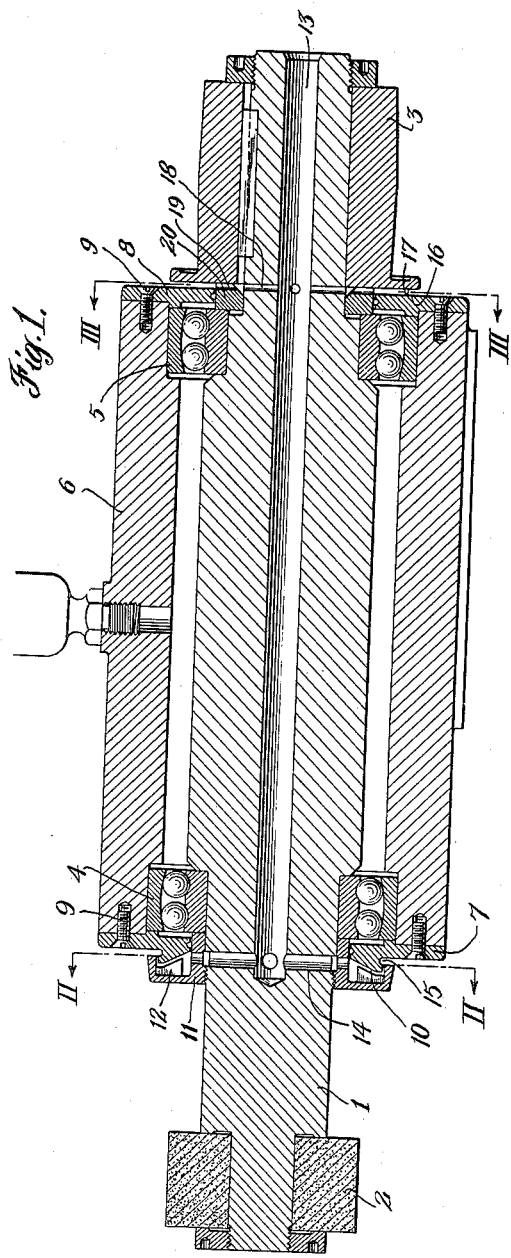
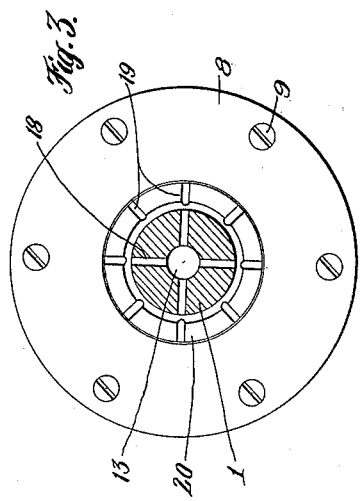
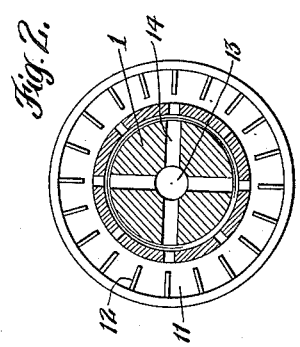
INVENTOR
Josef Henrik Emanuel Thorén
BY
HIS ATTORNEY Patented Dec. 3, 1940

2,223,748

UNITED STATES PATENT OFFICE 2,223,748

BEARING SEAL

Josef Henrik Emanuel Thorén, Goteborg, Sweden, assignor to Aktiebolaget Svenska Kullagerfabriken, Goteborg, Sweden, a corporation of Sweden Application December 13, 1938, Serial No. 245,498
In Sweden December 14, 1937

3 Claims. (Cl. 308—187.1)

The present invention relates to means for preventing the intrusion of dust or the like into bearing housings. The device is intended especially for use in spindles rotating at high speeds mounted in ball or roller bearings, for instance the spindles of grinding wheels or the like and comprises means for generating a current of air through a sealing space between a rotating and a stationary member. The device according to the invention is characterized by the provision in the spindle of an air inlet channel which communicates with the sealing space. This arrangement has the advantage that the air intake can be located in the most convenient manner at a desired place, for instance at a safe distance from a grinding wheel, whereby it is possible to avoid that the particles of metal and of grinding material are carried into the sealing space.

The invention is shown in the accompanying drawing, in which

Figure 1 shows a section along the axis of a grinding wheel spindle mounted in ball bearings and provided with a device according to the invention.

Figure 2 shows a section along the line II—II in Figure 1, and

Figure 3 shows a section along the line III—III in Figure 1.

In the embodiment illustrated 1 designates the spindle, on one end of which is carried a grinding wheel 2 and on the other end a pulley 3. This spindle is mounted in ball bearings 4 and 5 provided in the bearing housing. The bearing housing 6 is provided at each end with covers 7 and 8 which are fixed to the housing by means of screws 9 and provided with projecting flanges abutting against the outer race rings of the bearings. The central part of the cover 7 has a conical outer surface 10, which cooperates with a sealing member 11 screwed on to the rotatable spindle 1. The sealing member 11 is so formed that upon rotation of the spindle it has a tendency to create an outwardly directed current of air through the sealing space. In the embodiment shown, the sealing member 11 is provided with a number of wings 12 for this purpose.

The air which flows through the space between the surface 10 and the member 11 would naturally, if it were allowed to pass through the bearing, carry away with it the lubricant from the bearing and instead introduce into the bearing dust and other foreign particles, which would have an injurious effect upon the bearing. For this reason the device is arranged in such a manner that air is led through the sealing space past the bearing instead of between the race rings of the bearing. In the embodiment shown the spindle 1 is therefore provided with an axially extending channel or conduit 13 which connects with a number of radial channels 14 opening toward the inner periphery of the sealing space. When the spidle is rotating, air flows in through the channel 13 and under the influence of the centrifugal force out through the radial channels 14 and further through the sealing space between the surface 10 and the member 11 under the influence of the wings 12, whereby the current of air thus created prevents foreign particles of any kind from entering through the sealing space. At the forward end, that is, at the end of the spindle at which the grinding wheel is to be found, the sealing device is provided with an annular groove 15 which prevents coolant from passing into the sealing space when the spindle is stationary.

It is however not necessary for the operation of the device that the rotating sealing member is provided with wings. An example of a sealing device without wings is shown at the rear end of the spindle where both the surfaces 16 and 17 which form the sealing space are plane. The necessary centrifugal force for causing the outwardly directed current of air is here obtained mainly through the influence of the radial channels 18 in the spindle and corresponding channels 19 in the spacing ring 20 which also rotates with the spindle.

Further embodiments of the invention can be made without departing from the principle of the invention. Thus it is possible to generate a current of air without the action of centrifugal force. For instance channels may be provided leading to the sealing space and connected to a chamber having a pressure higher than that of the atmosphere.

Having thus described my invention, I claim and desire to secure by Letters Patent the following:

1. A device for preventing the intrusion of dust or the like into bearing housings, the combination with a rotating spindle mounted in antifriction bearings in a bearing housing, of a stationary sealing member extending radially from the bearing housing towards the spindle sufficiently to cover one end of the bearing gap, a second sealing member fixed to the rotating spindle and forming together with its companion an annular space, an axial air admission channel being formed in the spindle and having exhaust outlets opening into said space.

2. A device according to claim 1 in which there is a part rotating with the spindle, and the stationary sealing member extends radially to the close proximity of the said part, so that there is only a narrow passage left open between the annular space and the bearing.

3. A device for preventing the intrusion of dust or the like into bearing housings, the combination with a rotating spindle mounted in antifriction bearings in a bearing housing, of a stationary sealing member extending radially from the bearing housing towards the spindle sufficiently to cover one end of the bearing gap, a second sealing member fixed to the rotating spindle and forming together with its companion an annular space, an axial air admission channel being formed in the spindle and having exhaust outlets opening into said annular space, a series of impeller wings formed on the rotating sealing member for causing a radial outwardly directed stream of air through said space.

JOSEF HENRIK EMANUEL THORÉN.